Patented May 30, 1950

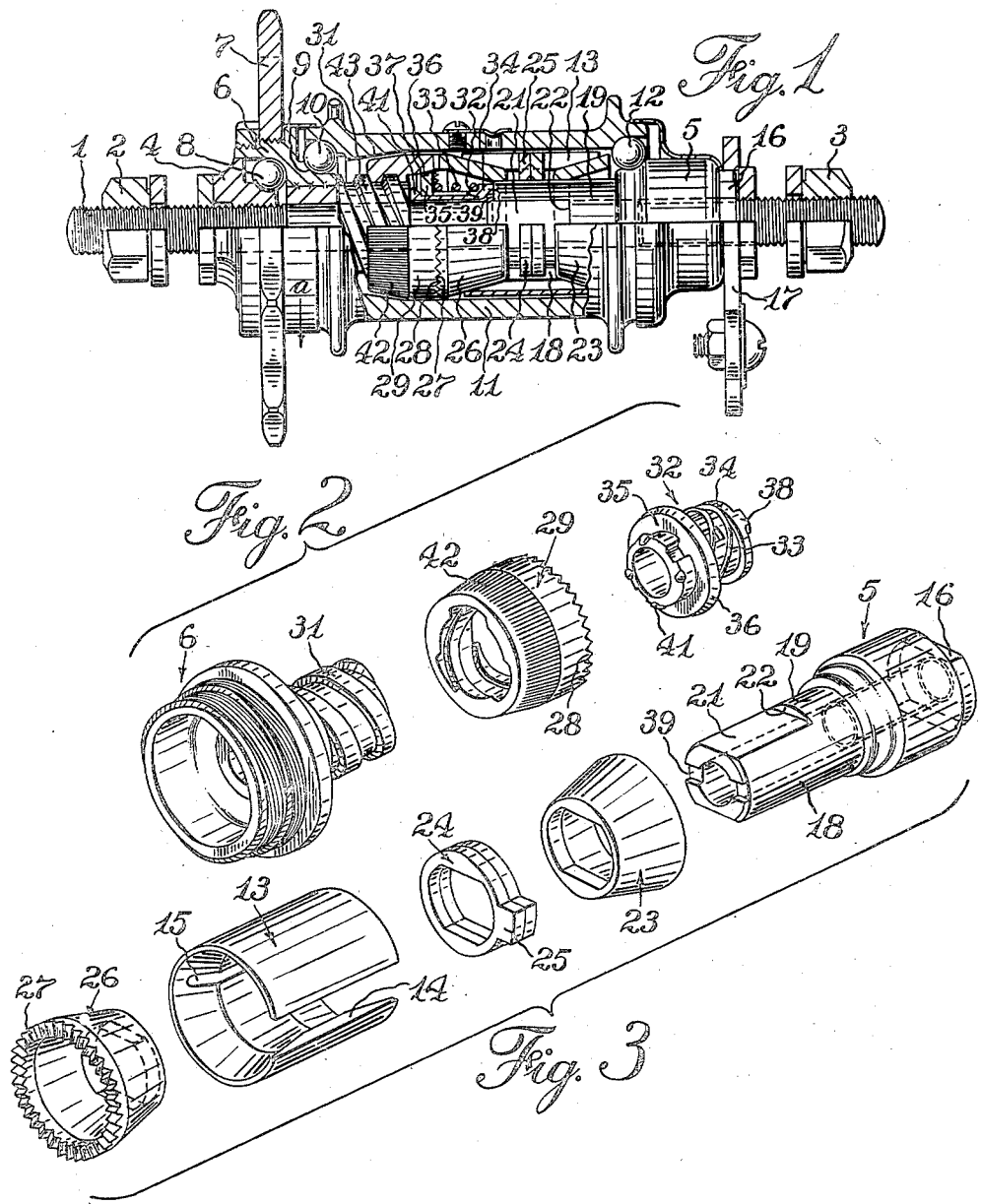

2,510,032

UNITED STATES PATENT OFFICE 2,510,032

COASTER BRAKE

E. Elliott Hood, Elmira, N. Y., assignor to Bendix Aviation Corporation, Elmira Heights, N. Y., a corporation of Delaware Application March 22, 1946, Serial No. 656,324

3 Claims. (Cl. 192—6)

The present invention relates to a coaster brake for velocipedes and the like and more particularly to a backpedaling hub brake.

It is an object of the present invention to provide a novel coaster brake that is strong in construction, easy to assemble and reliable in operation.

It is an other object of this invention to provide such a device in which all the braking elements are anchored positively against rotation.

It is a further object of this invention to provide a member for transmitting braking torque directly from the brake sleeve to the anchor member which is independent of the expanding means for the brake sleeve, and is symmetrically arranged with respect to said sleeve.

Further objects and advantages will be apparent from the following description taken in connection with the accompanying drawing, in which:

Fig. 1 is a side elevation partly broken away and in section of a preferred embodiment of the invention;

Fig. 2 is a detail in perspective of the driving member, the control nut and the detent member shown in disassembled relation; and Fig. 3 is a similar view of the brake sleeve, the conical expanders, the torque transfer members and the anchor member.

In Fig. 1 of the drawing, there is illustrated an axle 1 threaded at its ends for the reception of axle nuts 2 and 3, a bearing cone member 4 and a bearing cone and anchor member 5. A driving member 6 having a sprocket 7 fixedly mounted thereon is journalled on cone member 4 by means of bearings 8 and is provided with a bearing race 9 for the reception of bearings 10. A wheel hub 11 is journalled on the bearings 10 at one end and at the other end on bearings 12 which cooperate with anchor member 5. A cylindrical brake sleeve 13 of suitable material such as brass or bronze having a lengthwise slot 14 and an oppositely located internal groove 15 is formed with an exterior surface which fits loosely within the interior cylindrical surface of hub 11.

The anchor member 5 is formed with a non-circular portion 16 at one end adapted to receive a torque arm 17 for attachment to the frame of the bicycle. At its other end, the anchor member has a reduced extension 18 which is circular in cross section for a portion of its length as indicated at 19, the remainder of the extension being flattened on opposite sides as shown at 21 so as to provide shoulders 22. An expander cone 23 is slidably but non-rotatably mounted on the flattened part 21 of extension 18, normally bearing against the shoulders 22 in which position it forms a support for the correspondingly flared end of brake sleeve 13. One or more torque transfer members 24 are also slidably but non-rotatably mounted on the portion 21 of the anchor member and provided with lugs 25 arranged to project into the slot 14 of the brake sleeve and thereby transmit the braking torque thereof directly to the anchor member 5. A second expander cone 26 is similarly mounted on the portion 21 of the anchor member in position to cooperate with and support the other end of the brake sleeve 13. The expander 26 has dentals 27 adapted to receive dentals 28 of a control nut and drive clutch member 29 which is threaded on a screw shaft 31 formed as a part of driving member 6.

A detent sleeve 32 is slidably mounted on axle 1 and has a spring 33 thereon which bears at one end on a flange 34 of the sleeve, and at the other end engages a detent disc 35 splined on the sleeve having a conical peripheral surface 36 adapted to frictionally engage a corresponding surface 37 in the interior of the control nut 29.

The detent sleeve 32 is confined between the anchor member 5 and screw shaft 31, and is prevented from rotation by means of lugs 38 which engage in slots 39 formed in the end of the anchor member. In order to facilitate the handling and assembly of the detent structure, the disc 35 is preferably retained on the sleeve 32 by upsetting the end of the sleeve as indicated at 41.

The control nut 29 is provided with a tapered exterior clutch surface 42 adapted to engage a corresponding clutch surface 43 formed in the interior of the hub 11, the surface 42 being preferably knurled as shown in order to insure a positive clutch engagement.

In operation, forward rotation of driving member 6 in the direction of arrow $a$ causes the control nut to be traversed to the left, disengaging the dentals 27, 28, and closing the clutch 42, 43, whereby the hub 11 is caused to rotate with the driving member. Traversal of the control nut into clutching engagement with the hub is assured by the frictional engagement of the detent disc 35 with the interior of the control nut by expansion of spring 33. When the operator stops rotating the driving member, further rotation of the hub by momentum causes the control nut 29 to overrun the screw shaft 31 thus releasing the clutching engagement between the control nut and the hub 11.

To apply the brake, the operator turns driving member 6 backwards causing control nut 29 to traverse to the right until the dentals 28 thereof engage the dentals 27 of expander cone 26. Further backward rotation of the driving member forces the expanding members 26 and 23 into the brake sleeve 13 causing the brake sleeve to expand and bear frictionally against the interior of hub 11. The brake sleeve is prevented from rotation by the torque members 24, the lugs 25 of which engage said sleeve approximately midway between its ends. The braking torque is thus transferred directly to the anchor member 5 and then through the torque arm 17 to the frame of the bicycle. This arrangement for anchoring the brake sleeve increases the effectiveness of the brake by "servo" action, since the torque reaction tends to open up and spread the slot in the brake, thereby expanding the brake against the interior of the hub. This action is facilitated by the groove 15 which increases the flexibility of the sleeve.

Although but one embodiment of the invention has been shown and described in detail, it will be understood that other forms of the invention are possible and changes may be made in the proportions and arrangement of the parts without departing from the spirit of the invention as defined in the appended claims.

What is claimed is:

1. In a coaster brake, an axle, a non-rotatable anchor member fixed thereon, a driving member including a screw shaft, a wheel hub journalled on the driving and anchor members, a brake sleeve loosely mounted in the hub having an axial slot permitting expansion thereof into frictional contact with the interior of the hub; a pair of expanding cones slidably but non-rotatably mounted on the anchor member in position to enter and support the ends of the brake sleeve, a torque transfer member slidably but non-rotatably mounted on the anchor member within the brake sleeve substantially midway thereof, having a radial lug extending into the slot therein to thereby anchor the sleeve against rotation and assist in the expansion thereof; means including a clutch member threaded on the screw shaft for actuating the expanding cones responsive to backward rotation of the driving member, and detent means for resisting rotation of the clutch member, said detent means being located on the axle between the anchor member and the driving member, and frictionally engaging the interior of the clutch member.

2. In a coaster brake, an axle, a non-rotatable anchor member fixed thereon, a driving member including a screw shaft, a wheel hub journalled on the driving and anchor members, a brake sleeve loosely mounted in the hub having an axial slot permitting expansion thereof into frictional contact with the interior of the hub; a pair of expanding cones slidably but non-rotatably mounted on the anchor member in position to enter and support the ends of the brake sleeve, a torque transfer member slidably but non-rotatably mounted on the anchor member within the brake sleeve substantially midway thereof, having a radial lug extending into the slot therein to thereby anchor the sleeve against rotation and assist in the expansion thereof; means including a clutch member threaded on the screw shaft for actuating the expanding cones responsive to backward rotation of the driving member, and detent means for resisting rotation of the clutch member, said detent means including a sleeve located on the axle between the anchor member and driving member and non-rotatably connected to the anchor member, and a disc slidably mounted on the sleeve with means for yieldably urging it into engagement with the interior of the clutch member.

3. In a coaster brake, an axle, a non-rotatable anchor member fixed thereon, a driving member including a screw shaft, a wheel hub journalled on the driving and anchor members, a brake sleeve loosely mounted in the hub having an axial slot extending from end to end thereof so as to permit expansion of the sleeve into frictional contact with the interior of the hub; a pair of expanding cones slidably but non-rotatably mounted on the anchor member in position to enter and support the ends of the brake sleeve, a torque transfer member slidably but non-rotatably mounted on the anchor member within the brake sleeve substantially midway thereof, having a radial lug extending into the slot therein and forming an abutment for the advancing edge of the brake sleeve, the other edge of the sleeve being free of the torque transfer member whereby the braking torque assists the brake sleeve to expand against the interior of the hub by servo action.

E. ELLIOTT HOOD.

REFERENCES CITED

The following references are of record in the file of this patent:

UNITED STATES PATENTS

| Number | Name | Date |
|---|---|---|
| 2,321,150 | Lewis | June 8, 1943 |